United States Patent
Labidi et al.

(10) Patent No.: US 6,873,765 B2
(45) Date of Patent: Mar. 29, 2005

(54) DYNAMIC GAIN EQUALIZING FILTER

(75) Inventors: Hedi Labidi, Paris (FR); Carlos De Barros, Boulogne-Billancourt (FR); Hervé Loury, Chatillon-en-Vendelais (FR); Xavier Bonnet, Remy les Chevreuse (FR); Isabelle Riant, Orsay (FR); Jean-Jacques Guerin, Antony (FR)

(73) Assignee: Avanex Corporation, Fremont, CA (US)

( * ) Notice: Subject to any disclaimer, the term of this patent is extended or adjusted under 35 U.S.C. 154(b) by 129 days.

(21) Appl. No.: 10/412,301

(22) Filed: Apr. 14, 2003

(65) Prior Publication Data

US 2003/0194182 A1 Oct. 16, 2003

(30) Foreign Application Priority Data

Apr. 15, 2002 (FR) ............................................ 02 04677

(51) Int. Cl.$^7$ ................................................ G02B 6/34
(52) U.S. Cl. ............................ 385/37; 385/125; 385/10; 385/40
(58) Field of Search ........................ 385/37, 125, 40, 385/6, 5, 8, 10, 12, 15, 25

(56) References Cited

U.S. PATENT DOCUMENTS

| | | | |
|---|---|---|---|
| 6,058,226 A | | 5/2000 | Starodubov |
| 6,301,408 B1 | * | 10/2001 | Espindola et al. ............. 385/37 |
| 6,498,877 B1 | * | 12/2002 | Chowdhury et al. .......... 385/37 |
| 2003/0007731 A1 | * | 1/2003 | Bakhti et al. ................. 385/37 |
| 2003/0165313 A1 | * | 9/2003 | Broeng et al. ............... 385/125 |
| 2003/0169987 A1 | * | 9/2003 | Eggleton et al. ............. 385/125 |

FOREIGN PATENT DOCUMENTS

| EP | 0 989 437 A1 | 3/2000 |
|---|---|---|
| EP | 1 063 741 A2 | 12/2000 |

OTHER PUBLICATIONS

Yin S et al.: "A Novel All–Optic Tunable Long–Period Grating Using a Unique Double–Cladding Layer" Optics Communications, North –Holland Publishing Co. Amsterdam. NL, vol. 196. No. 196. Sep. 1, 2001, pp. 181–186, XP004300744.

Khaliq S et al: "Fiber–Optic Liquid –Level Sensor Using a Long–period Grating" Optics Letters, Optical Society of America. Washington, US, vol. 26, No. 16, Aug. 15, 2001, pp. 1224–1226. XP001110595.

* cited by examiner

*Primary Examiner*—Frank G. Font
*Assistant Examiner*—K. Cyrus Kianni
(74) *Attorney, Agent, or Firm*—Moser, Patterson & Sheridan, L.L.P.

(57) ABSTRACT

A tuneable optical fibre comprising a long-period Bragg grating (5) written in a portion of an optical waveguide (10) comprising a core and an optical cladding (11), characterised in that the portion of the waveguide comprising the grating (5) is at least partially immersed in an external environment consisting of two distinct sections, a first section (1) whose refractive index is higher than that of the optical cladding (11) and a second section (2) whose refractive index is lower than that of the optical cladding (11), the long-period grating being at least partially immersed in one of the said sections so as to almost independently tune the wavelength and/or the contrast of the spectral response of the filter.

13 Claims, 3 Drawing Sheets

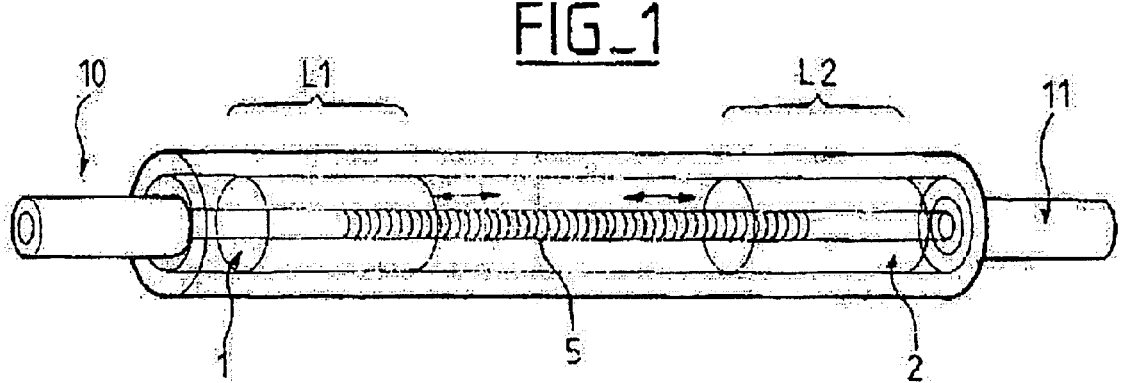
FIG_1
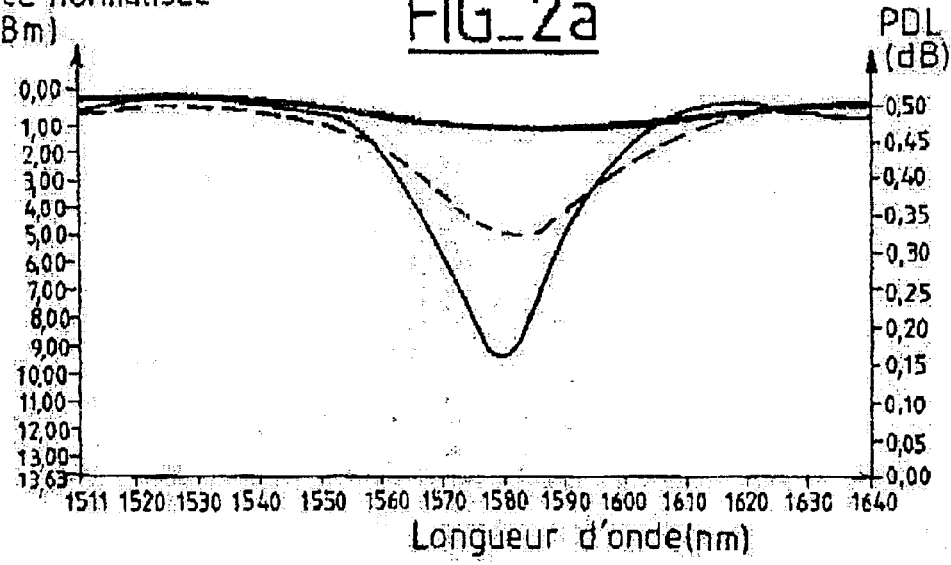
FIG_2a
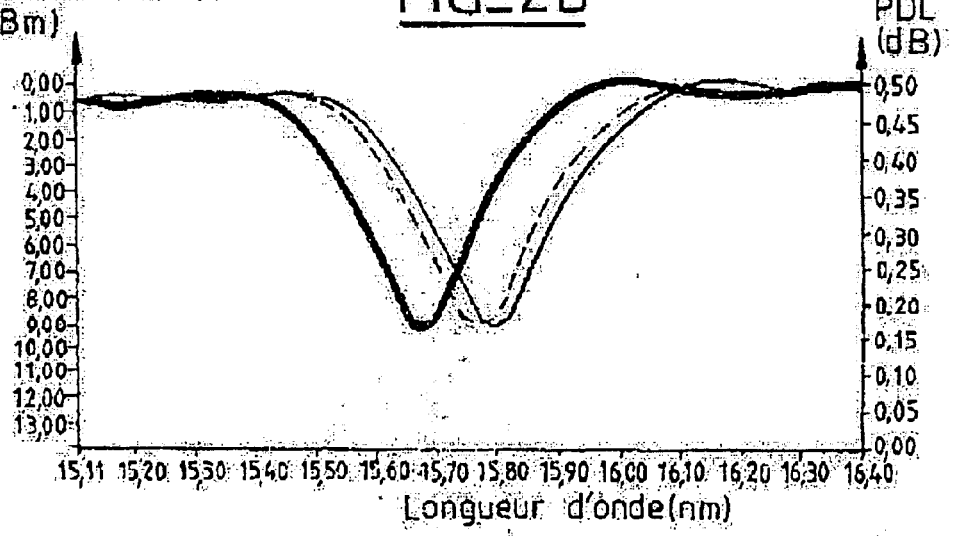
FIG_2b

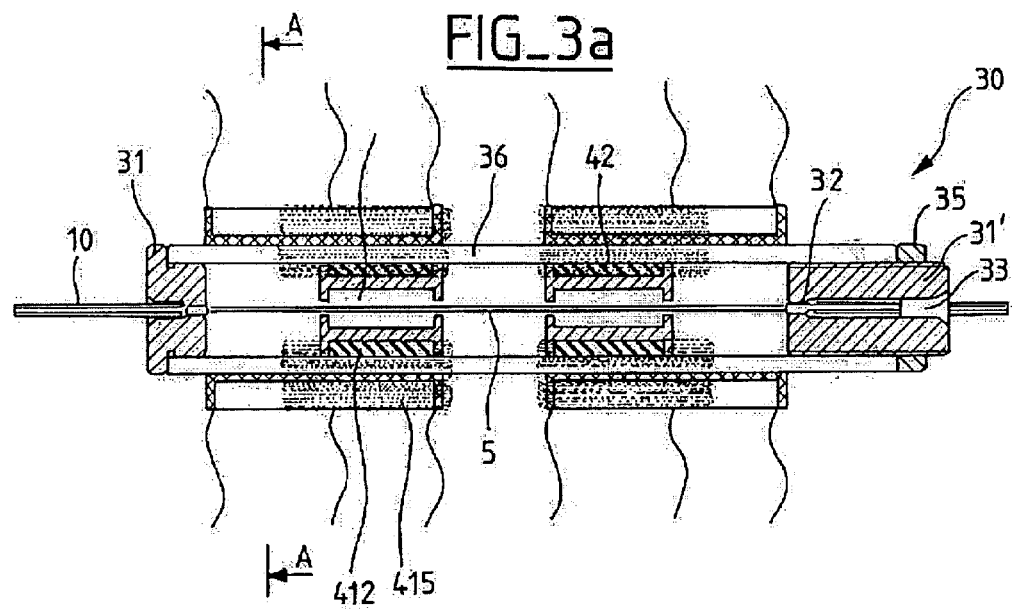
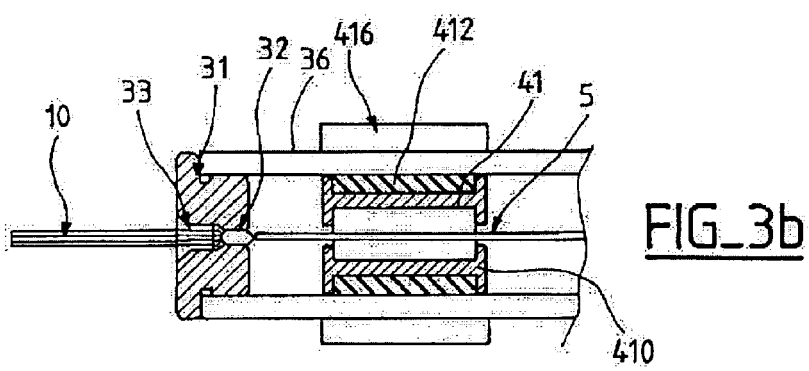
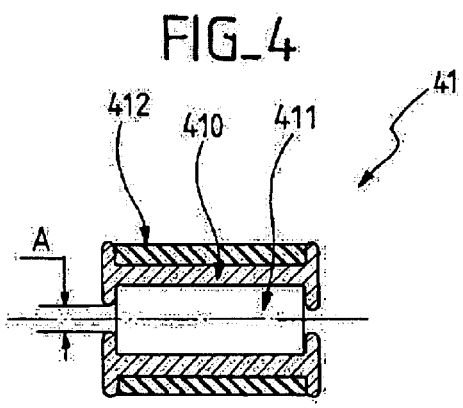

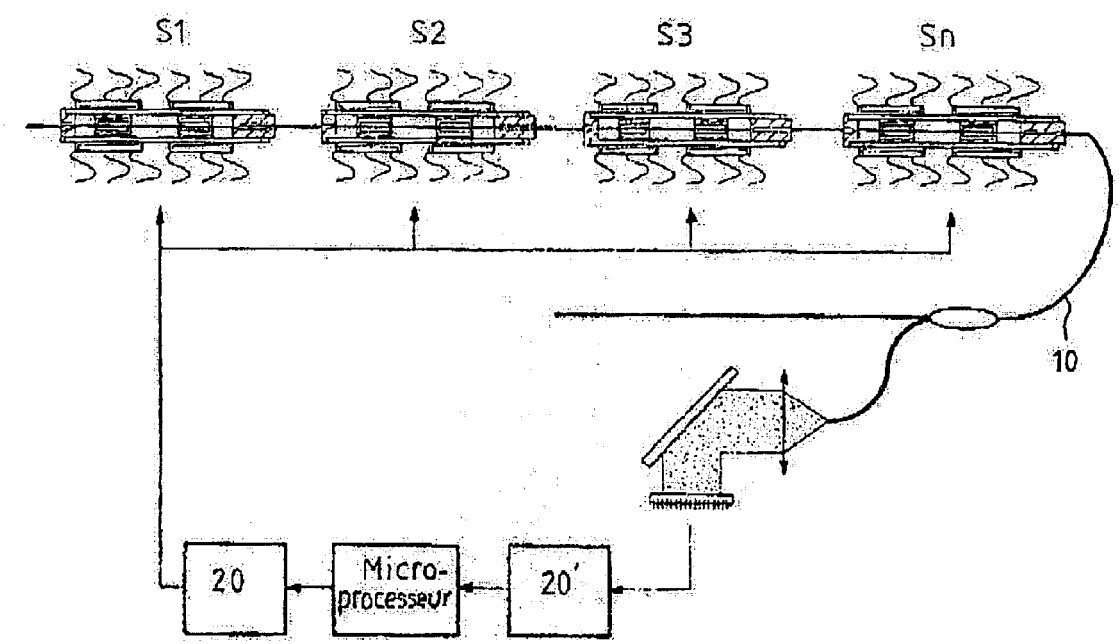
FIG_5
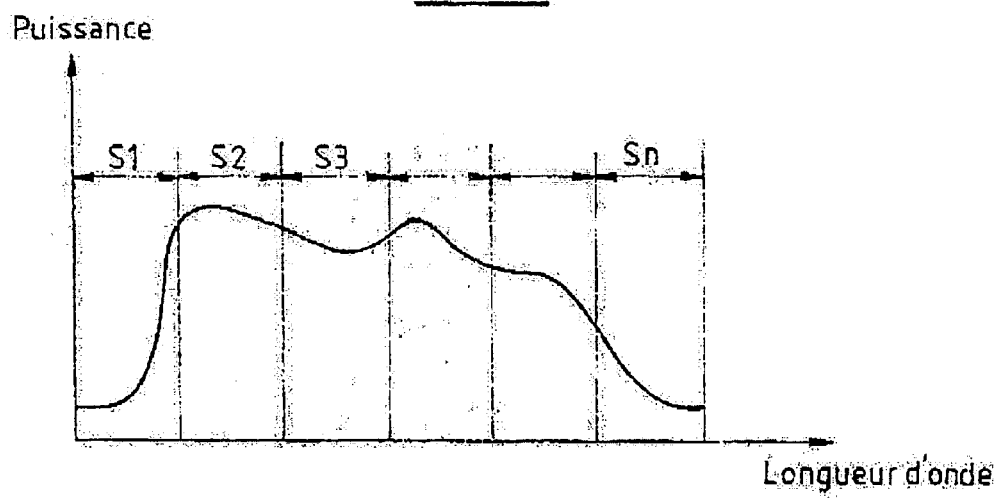
FIG_6

DYNAMIC GAIN EQUALIZING FILTER

The present invention concerns the field of optical filters consisting of Bragg gratings photo-written in optical fibres and more particularly non-reflecting filters with coupling in the cladding modes for application to gain equalisers.

Gain equalising filters, also known by the acronym GFF, standing for Gain Flattening Filter, are integrated in optical systems and are generally associated with optical amplifiers disposed in optical repeaters distributed regularly along transmission lines. Optical amplifiers do not generally provide equal amplification for all wavelengths of the signals transmitted over the various channels of the same transmission line. In particular, with the development of dense wavelength division multiplexing (DWDM) applications, the disparities in amplification on a given bandwidth have a tendency to be accentuated. It is therefore necessary to associate, with line amplifiers, gain flattening filters which re-establish the disparities in amplification of the various transmission channels in an optical system.

However, an optical system is often open to change and it is not rare for the parameters of an optical component, such as a gain equaliser, to be no longer at all adapted to the actual transmission spectra. For example, such a change may be due to aging, to a variation in temperature, to localised work on the line or to additions of optical modules or optical transmission channels after the installation of the line. The previously fixed parameters for the various components of the optical system then become unsuited.

In addition, in the case of fibre amplifiers (Erbium doped or Raman amplifiers), the amplifiers are associated with pump lasers whose performances are fixed at the time of installation. However, amplifiers, just like pump lasers, are often standardised and not necessarily well suited to the operating conditions in which they are placed, nor even more so to any changes in these.

With regard to these specific problems related to changes in optical systems, reference can be made to the article by Simon P. Parry et al, "Dynamically Flattened Optical Amplifier", TU4OFC 2001which discloses the reasons for a need to produce tuneable optical components in order to mitigate any drifts in optical systems over time.

It is therefore necessary to produce flattening filters which make it possible to dynamically tune their spectral response in order to correspond to the changes in operating conditions of the optical systems in which they are disposed.

It is also necessary to provide adapted packaging making it possible to tune such gain flattening filters (known as DGEs, standing for Dynamic Gain Equalizers), easily over a wide spectral range and without losses.

Dynamic equalising filters may be of the fibre type such as Mach Zehnder filters or acousto-optical filters for example, or free-space filters such as a Faraday rotator. However, such dynamic gain equalisers have the drawback of having high insertion losses (IL<6 dB) and polarisation dependent losses (PDL<0.3 dB). In particular, the packaging of such filters is complex and generally has recourse to mountings of the MEMS or MEOMS type (standing respectively for Micro Electro Mechanical Systems and Micro Electro-Optical Mechanical Systems).

Equalising filters can also consist of Bragg gratings photo-written on portions of waveguides such as optical fibres or planar waveguides. Such a filter constitutes a component integrated in an optical guide and considerably reduces insertion or polarisation dependent losses.

A waveguide is conventionally composed of an optical core, whose function is to transmit and possibly amplify an optical signal, surrounded by an optical cladding whose function is to confine the optical signal in the core. To this end, the refractive indices of the core $n_1$ and of the cladding $n_2$ are such that $n_1 > n_2$. Thus the core and cladding form a waveguide. As is well known, the propagation of an optical signal in a single-mode waveguide is broken down into a fundamental mode guided in the core and secondary modes guided over a certain distance in the core/optical cladding assembly, also referred to as cladding modes. The cladding is itself surrounded by an external environment with a refractive index $n_3>$ or $<n_2$. The core/cladding assembly associated with the external environment once again forms a waveguide.

The core and/or the cladding of the guide can be doped so as to be made photosensitive for a Bragg grating writing, for example with germanium (Ge). The gratings conventionally used for gain equalisations are slanted gratings, known by the term SBGs, standing for Slanted Bragg Gratings, or long-period gratings, known as LPGs, standing for Long Period Gratings. Such gratings are designed to allow coupling of the fundamental mode in the cladding modes without reflection at the coupling wavelength.

In the case of a long-period grating, the spectral response of the filter depends on the effective index of the core $n_{effCore}$ of the guide as well as the effective index of the cladding $n_{effCladding}$. This is because the Bragg equation for long-period gratings is expressed as follows:

$$\lambda_B = \Lambda(n_{effCore} - n_{effCladding})$$

with $\Lambda$ the period of the LPG.

This particularity of long-period gratings makes them particularly well suited to applications with tuneable filters since a localised action on the core, on the cladding and/or on the environment external to the cladding may cause a modification to one of the effective indices and therefore to the Bragg length of the filter. In addition, the insertion losses in such a filter are low and the known methods of manufacturing such filters make it possible to obtain very low polarisation dependent losses.

The object of the present invention is to propose a tuneable optical filter which affords a dynamic gain equalisation using a long-period Bragg grating, referred to as an LPG.

The filter according to the invention can also be applied to dynamic slope compensators.

To this end, the invention proposes to modify the interface conditions between the cladding and the external environment. The LPG is immersed, totally or partially, in an external environment composed of two distinct sections for modifying on the one hand the attenuation and on the other hand the wavelength of the filter.

It is thus possible to obtain tuneability of the wavelength and of the contrast of the spectral response of the filter in an almost independent manner. This tuneability can advantageously be dynamic.

Another object of the invention is to propose an advantageous packaging of a tuneable filter according to the invention making it possible to achieve the required tuneability easily.

The invention also concerns an optical gain equalisation system integrating tuneable optical filters according to the invention, advantageously packaged according to the invention.

More particularly, the present invention relates to a tuneable optical filter comprising a long-period Bragg grating written in a portion of an optical waveguide comprising a core and an optical cladding, characterised in that the portion of the waveguide comprising the grating is at least partially immersed in an external environment consisting of two distinct sections, a first section whose refractive index is higher than that of the optical cladding and a second section whose refractive index is lower than that of the optical cladding, the long-period grating being at least partially immersed in one of the said sections so as to almost independently tune the wavelength and/or the contrast of the spectral response of the filter.

According to one characteristic, the grating is at least partially immersed in each of the sections of the external environment.

According to another characteristic, the level of immersion of the grating in the sections of the external environment is dynamically variable.

According to the embodiment, the sections of the external environment are composed of fluids, gels or polymers.

The invention also concerns a device for packaging the filter according to the invention, characterised in that the sections of the external environment are disposed in movable reservoirs associated with electromagnetic control means.

According to one characteristic, each reservoir is composed of a receptacle containing a material with a refractive index distinct from that of the optical cladding, the receptacle being surrounded by electromagnetic control means.

According to the embodiment, the electromagnetic control means comprise a plurality of coils supplied separately with voltage and current and/or a magnetic ring.

The invention also relates to an optical gain equalisation system comprising a plurality of filters according to the invention.

According to one characteristic, each filter is tuned by means of a filter packaging device according to the invention.

The particularities and advantages of the present invention will emerge more clearly from a reading of the following description given by way of illustrative and non-limiting example and made with reference to the accompanying figures, in which:

FIG. 1 is an outline diagram of a filter according to the invention;

FIGS. 2a and 2b are graphs illustrating the effect of the immersion of the LPG in a fluid on the transmission spectrum of the filter;

FIG. 3a illustrates schematically a packaging of the filter according to a first embodiment according to the invention;

FIG. 3b illustrates schematically a packaging of the filter according to a second embodiment according to the invention;

FIG. 4 is a detail view of a reservoir in the packaging in FIG. 3a or 3b;

FIG. 5 illustrates a gain equalisation system using a plurality of filters according to the invention;

FIG. 6 is a graph of a transmission spectrum obtained with a system according to FIG. 5.

The optical filter according to the invention, illustrated schematically in FIG. 1, consists of a long-period Bragg grating 5, referred to as an LPG, written in a portion of an optical waveguide 10, such as an optical fibre or a planar waveguide, comprising a core surrounded by an optical cladding 11. The grating 5 can be written in the core and/or in the sheath of the waveguide 10, in accordance with the methods of use and applications of the filter.

According to the invention, the portion of the waveguide 10 comprising the grating 5 is at least partially immersed in an external environment whose refractive index is different from the index of the optical cladding 11 of the waveguide. This external environment consists of two distinct sections. A first section 1 has a refractive index higher than that of the optical cladding 11 and a second section 2 has a refractive index lower than that of the optical cladding 11. The sections 1 and 2 of the external environment can consist of reservoirs containing fluids L1 and L2 such as oils or gels for example. The sections of the external environment can also be composed of polymers surrounding portions of the optical cladding 11 of the guide 10.

The total or partial immersion of a guide portion 10 in an external environment, whose refractive index is different from the index of the cladding 11, causes a change to the interface conditions between the cladding and the external environment. However, it has already been mentioned that an LPG was particularly sensitive to changes in the environment external to the cladding of the guide on which it is written. Thus, according to the level of immersion of the long-period grating in one of the sections of the external environment, it is possible to modify the spectral response of the filter.

In particular, the effects of the total or partial immersion of an LPG in an external environment whose refractive index is higher than the index of the guide comprising the LPG have already been described in the article "Fiber-optic liquid level sensor using a long period grating" by S. Khaliq et al. which appeared in O. letters, Vol 26 Issue 16p 1224.

This article describes an application to a liquid-level sensor. A waveguide comprising an LPG is immersed in an external environment having a refractive index higher than the refractive index of the optical cladding. The variation in the area of immersion in this external environment causes a variation in the loss of some of the energy of the optical signal in the cladding on the cladding/external environment interface by Fresnel refraction, whilst the remainder of the energy is reflected. The article describes the effect of the level of immersion in the LPG in the external environment on the minimum transmission level of the optical signal in the filter for a liquid-level detection. This article also describes the appearance of a second filter with a wavelength distinct from the first filter, but it has not been possible for the applicant to reproduce this phenomenon.

Contrary to what is described in this article, the invention proposes to use the effects of the immersion of a grating in an external environment in order to achieve tuneability of the filter in terms of contrast. In addition, the grating is also immersed in another external environment with an index lower than the index of the optical cladding in order to obtain tuneability of the filter in terms of wavelength. Thus, according to the invention, the external environment is composed of two distinct sections for tuneability of the spectral response of the filter in terms of contrast and in terms of wavelength.

In particular, the contrast and the wavelength of the spectral response of the filter according to the invention can be tuned almost independently, simultaneously or successively. Almost independent tuneability of the wavelength and of the contrast means the fact that these two parameters are almost completely dissociated. In general, the fluid in one of the sections of the external environment acts mainly on one of the parameters and very slightly on the other. Nevertheless, through an appropriate choice of the components of the external environment and through optimised packaging, as will be described below, it is possible to dissociate the parameters of the wavelength and contrast from each other in order to tune the spectral response of the filter.

FIG. 2a illustrates the spectral response of an LPG filter immersed in a first section 1 whose refractive index is higher than that of the optical cladding. The graph reproduces three conditions of immersion of the LPG in an environment external to the guide with a refractive index of 1.51. The waveguide is made from silica.

The spectral response reproduced in a thin unbroken line corresponds to that for which the LPG is not at all immersed, the external environment then being air, the spectral response in a dotted line is that for which the LPG is 40% immersed in the first section 1 of the external environment and the spectral response in a thick unbroken line is that for which the LPG is totally immersed in the first section 1 of the external environment.

The level of immersion of the LPG in an environment with a refractive index higher than that of the optical cladding therefore directly modifies the value of the minimum transmission of the signal through the filter in accordance with the following equation:

$$T(\kappa, L, l) = \cos^2(\kappa L) \cdot \sin^2[\pi/2 \cdot (L-l)/L]$$

Qualitatively, the attenuation of the filter is related to the expansion of the cladding modes in the external environment, thus reducing the entire overlap between the fundamental mode and the cladding modes.

FIG. 2b illustrates the spectral response of an LPG filter immersed in a second section 2 whose refractive index is lower than that of the optical cladding. The graph reproduces three conditions of immersion of the LPG in an environment external to the guide with a refractive index of 1.33. The waveguide is made from silica.

The spectral response reproduced in a thin unbroken line corresponds to that for which the LPG is not at all immersed, the spectral response in dotted line is that for which the LPG is 10% immersed in the second section 2 of the external environment and the spectral response in a thick unbroken line is that for which the LPG is totally immersed in the second section 2 of the external environment.

The level of immersion of the LPG in an environment with a refractive index less than that of the optical cladding therefore directly modifies the value of the wavelength of the filter. Qualitatively, this modification of the Bragg wavelength of the filter is related to a modification of the propagation constant of the cladding modes along the immersed portion, thus giving rise to a modification to the effective index of the coupling cladding mode $n_{effcladding}$ implying a change in the wavelength in accordance with the formula disclosed above $\lambda B = \Lambda(n_{effcore} - n_{effcladding})$.

The combination of these two effects on the cladding modes, namely the change in the effective index of the cladding modes and their expansion, makes it possible to achieve complete tuneability of the filter, with regard to both contrast and wavelength. It has thus been possible to obtain a shift in wavelength of 40 nm and a variation in contrast as far as total extinction.

FIG. 3a illustrates schematically a first embodiment of a packaging of the filter according to the invention making it possible to effectively achieve tuneability of the said filter in terms of contrast and wavelength.

The optical waveguide, a fibre 10 in the example illustrated, is positioned in a package 30 and fixed in mechanical holding elements 31, 31', for example with adapted optical 32 and mechanical 33 adhesives. Preferably at least one of the holding elements 31 is fixed whilst the other 31' is able to be moved, for example by means of a nut 35 for putting the fibre 10 under tension.

The Bragg grating constituting the filter 5 is thus placed inside a cavity provided in the package 30, which has a dielectric cladding 36, such as a tube made from Pyrex or the like. Reservoirs 41 and 42 are also disposed in the cavity of the package 30, inside the dielectric tube 36 and around the optical guide 10. These reservoirs 41, 42 contain respectively a first and second section of an external environment, such as oils, gels or polymers with a refractive index determined for the tuneability of the filter in accordance with the principles described above.

Each reservoir 41, 42 is also surrounded by electromagnetic control means 415 allowing a lateral movement of each reservoir along the filter 5 inside the cavity of the package 30 for putting the reservoirs 41, 42 in contact with the cladding 11 of the fibre 10 level with the LPG grating 5.

FIG. 4 illustrates a detail view of a reservoir 41 in the packaging in FIG. 3. Such a reservoir 41 consists of a mechanical receptacle 410 enclosing a so-called external environment 411 composed of a material specifically determined for the application to the tuneable filter according to the invention. The external material 411 can be a fluid or a polymer. It is chosen according to various criteria including amongst others the refractive index, the viscosity, the surface tension, the thermal expansion coefficient, the temperature coefficient $Dn_D/DT$, and its compatibility with the reservoir. The receptacle 410 of the reservoir 41 is also surrounded by electromagnetic control means 412 such as magnets.

Preferentially, the outside diameter of the magnet 412 is smaller than the inside diameter of the dielectric tube 36 and the outside diameter of the receptacle 410 is adjusted to the inside diameter of the said tube 36 to allow a movement of the reservoirs 41, 42 by sliding inside the cavity in the packaging 30 according to the invention. In addition, the roughnesses of the materials constituting the reservoir 410 and the tube 36 are such that the friction is minimised. In addition, it is preferable for the dielectric tube 36 to have a non-cylindrical symmetry in transverse section to allow the movement of the air flows and to prevent a piston phenomenon when the reservoirs 41, 42 move.

The electromagnetic control means of the reservoirs 412 are coupled to electromagnetic control means 415 disposed outside the cladding 36 of the package 30 according to the invention. According to the embodiment illustrated in FIG. 3, each electromagnetic control means 415 is composed of several individual coils supplied separately with voltage and current. When the same voltage is applied to each coil of the control means 415, the magnetic field is constant around the reservoirs 41, 42, which then remain immobile. On the other hand, when a different voltage is applied to the different coils of the electromagnetic control means 415, a differential magnetic field is created and causes a movement of the reservoirs 41, 42 by means of the magnets 412 disposed around each reservoir.

Thus, by controlling the supply to each coil of the control means 415 external to the package 30 according to the invention, it is possible to cause successive or simultaneous movements of one or other reservoir 41, 42 in order to immerse the filter 5 more or less in one or other external environment.

FIG. 3b illustrates a second embodiment of the packaging of a filter according to the invention. The same elements in FIG. 3a are designated by the same references.

According to this, second embodiment, the control means coupled to the magnets 412 of the reservoirs can be composed of magnetic rings 416 disposed around the dielectric tube 36. The magnetisation of each reservoir 41 makes it possible to move the latter conjointly with each ring 416. Such a magnetic ring can be moved by means of an external tool for example and the reservoir coupled to this ring will then be moved conjointly. This embodiment makes it possible to dispense with an external voltage and current supply. This embodiment is particularly adapted to adjustments of filters during their installation, the magnetic rings being fixed when the adjustment is accomplished.

On the other hand, for dynamic tuneability of the filter, the embodiment illustrated in FIG. 3a is more adapted since it allows adjustment by external control.

FIG. 5 illustrates an optical gain flattening system using filters according to the invention, packaged according to the invention. Several filters consisting of long-period gratings, LPGs, can advantageously be combined and tuned independently of one another in such an optical gain flattening system.

This is because it is conventional to have to have available a plurality of optical filters for achieving complete gain flattening, in particular in the context of DWDM systems as presented above. The invention thus proposes an optical gain flattening system comprising a concatenation of optical filters Sn according to the invention, each filter being dynamically tuned independently by means of a packaging according to the invention. The concatenation of the elementary filters is referred to hereinafter as a complex flattening filter.

In an appropriate assembly, the waveguide 10 at the output of the complex filter is coupled to an optoelectronic system including optical elements for focusing (lenses), diffraction and detection (photodiodes) as well as electronic control and actuation elements 20, 20' and a microprocessor.

The optoelectronic system determines the control voltages and currents to be applied to each coil of each electromagnetic control means for each elementary filter in order to obtain a refined flattening system as illustrated in the graph in FIG. 6.

Typically a movement of approximately 10 mm can be obtained for each reservoir along an elementary filter with a control voltage of approximately 10 V, which represents only a few milliamperes of current. It is thus possible to tune each elementary filter of the gain flattener specifically and independently for a given spectral band with limited optical insertion losses <0.1 dB per filter) and reduced polarisation dependent losses (<0.1 dB per filter).

In addition, the system according to the invention has a response time of a few milliseconds and requires a negligible power supply.

What is claimed is:

1. A tuneable optical filter comprising a long-period Bragg grating (5) written in a portion of an optical waveguide (10) comprising a core and an optical cladding (11), characterised in that the potion of the waveguide comprising the grating (5) is at least partially immersed in an external environment consisting of two distinct sections, a first section (1) whose refractive index is higher than that of the optical cladding (11) and a second section (2) whose refractive index is lower than that of the optical cladding, the long-period grating being at least partially immersed in one of the said sections so as to almost independently tune the wavelength and/or the contrast of the spectral response of the filter.

2. An optical filter according to claim 1, characterised in that the grating (5) is at least partially immersed in each of the sections (1, 2) of the external environment.

3. An optical filter according to claim 1, characterised in that the level of immersion of the grating (5) in the sections (1, 2) of the external environment is dynamically variable.

4. An optical filter according to claim 1, characterised in that the sections (1, 2) of the external environment are composed of fluids (L1, L2).

5. An optical filter according to claim 1, characterised in that the sections (1, 2) of the external environment are composed of gels.

6. An optical filter according to claim 1, characterised in that the sections (1, 2) of the external environment are composed of polymers.

7. An optical filter according to claim 1, characterised in that the optical waveguide is an optical fibre or a planar waveguide.

8. A device for packaging the filter according to claim 1, characterised in that the sections (1, 2) of the external environment are disposed in movable reservoirs (41, 42) associated with electromagnetic control means (415).

9. A packaging device according to claim 8, characterised in that each reservoir (41) is composed of a receptacle (410) containing a material (411) with a refractive index distinct from that of the optical cladding, the receptacle (410) being surrounded by electromagnetic control means (412).

10. A packaging device according to claim 8, characterised in that the electromagnetic control means (415) comprise a plurality of coils supplied separately with voltage and current.

11. A packaging device according to claim 8, characterised in that the electromagnetic control means comprise a magnetic ring (416).

12. An optical gain flattening system comprising a plurality of tuneable optical filters ($S_1, S_n$) each comprising a long-period Bragg grating (5) written in a portion of an optical waveguide (10) comprising a core and an optical cladding (11), characterised in that the portion of the waveguide comprising the grating (5) is at least partially immersed in an external environment consisting of two distinct sections, a first section (1) whose refractive index is higher than that of the optical cladding (11) and a second section (2) whose refractive index is lower than that of the optical cladding, the long-period grating being at least partially immersed in one of the said sections so as to almost independently tune the wavelength and/or the contrast of the special response of the filter, characterised in that each filter is tuned by means of a filter packaging device according to claim 8.

13. An optical gain flattening system comprising a plurality of optical filters ($S_1, S_o$) according to claim 1.

* * * * *